(12) United States Patent
Winkowski

(10) Patent No.: US 6,468,632 B2
(45) Date of Patent: Oct. 22, 2002

(54) METHOD OF EDGE-SEALING GYPSUM BOARD FOR CLEAN ROOM QUALITY

(75) Inventor: Daniel A. Winkowski, Tonawanda, NY (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 09/731,332

(22) Filed: Dec. 6, 2000

(65) Prior Publication Data

US 2002/0068184 A1 Jun. 6, 2002

(51) Int. Cl.[7] .................. B32B 13/00; B32B 13/04; B32B 13/12; B32B 13/14; B32B 27/36
(52) U.S. Cl. .............. 428/192; 428/480; 428/703; 427/140; 427/154; 427/212; 427/215; 427/218; 427/220; 427/289; 427/290; 427/293; 528/293; 528/294; 528/295; 106/772; 106/783
(58) Field of Search ................ 428/192, 480, 428/482, 702, 703, 81, 98; 528/293, 294, 302, 308, 307, 295; 427/140, 154, 212, 215, 218, 220, 289, 290, 293; 106/772, 783, 786

(56) References Cited

U.S. PATENT DOCUMENTS

| | | |
|---|---|---|
| 3,734,874 A | 5/1973 | Kibler et al. |
| 3,779,993 A | 12/1973 | Kibler et al. |
| 3,935,049 A | 1/1976 | Schmidt et al. |
| 3,998,015 A | 12/1976 | Scott et al. |
| 4,233,196 A | 11/1980 | Sublett |
| 4,335,220 A | 6/1982 | Coney |
| 4,466,151 A | 8/1984 | Barch et al. |
| 4,967,530 A | 11/1990 | Clunn |
| 5,033,247 A | 7/1991 | Clunn |
| 5,108,788 A | 4/1992 | Williams |
| 5,331,039 A * | 7/1994 | Blum et al. .............. 524/507 |
| 5,344,873 A * | 9/1994 | Blum .................... 524/539 |
| 5,514,222 A | 5/1996 | Williams |
| 5,779,786 A | 7/1998 | Patel |
| 5,879,446 A | 3/1999 | Patel et al. |
| 5,993,909 A | 11/1999 | Mizutani et al. |

* cited by examiner

Primary Examiner—Vivian Chen
(74) Attorney, Agent, or Firm—Howrey, Simon, Arnold & White, LLP

(57) ABSTRACT

A method for coating the sawed edges of gypsum wallboard to prevent dusting of gypsum particles in clean rooms. The method includes applying a water-dispersible polymers to the sawed edges of gypsum wallboard. The polymer forms a water-insoluble salt through an ion exchange with the calcium found in gypsum wallboard. The result is a tough, tack free, fast-drying coating that substantially reduces the levels of airborne gypsum particles that come from the sawed edges of gypsum wallboards.

20 Claims, No Drawings

METHOD OF EDGE-SEALING GYPSUM BOARD FOR CLEAN ROOM QUALITY

BACKGROUND OF THE INVENTION

1. Field of the Invention

The invention relates generally to a method for preventing dusting of gypsum board material from sawed edges of gypsum panels. More specifically, the invention is directed to the treatment of cut, e.g., sawed edges of gypsum panels to prevent gypsum dusting in clean rooms.

2. Brief Description of Related Technology

Gypsum wallboards are commonly used today for the construction of ceiling grid panels. The panels are often cut to nominal 2'×4' or 2'×2' sizes. The cut edges of these panels can be a source of contamination when the ceiling grid panels are used in clean rooms because the gypsum particles can become airborne. The level of particulates in clean rooms must meet stringent federal standards. Therefore, if the panels are to be used in a clean room, the cut edges of the gypsum ceiling grid panels need to be treated to prevent gypsum particles from contaminating the clean room. It would be desirable to have a tough, fast-drying, tack-free coating that can be applied to cut or sawed edges of gypsum panels that are used in clean rooms that would prevent dusting of gypsum particles.

SUMMARY OF THE INVENTION

In brief, the present invention is directed to a method for sealing the cut edges of a gypsum panel by coating the edges with an effective amount of a composition comprising water and a water-dispersible alkali metal sulfonate-containing polymer.

One aspect of the invention is to provide a gypsum panel wherein cut edges are coated with a water-dispersible alkali metal sulfonate-containing polymer, preferably a polyester. The polymer forms a tough, tack-free coating that prevents dusting of gypsum particles. This panel, with the coated edges, is suitable for use in clean rooms because of the extremely low levels of gypsum particles that separate from the edges of a cut gypsum panel, after coating.

Another aspect of the invention is to provide a method for coating cut edges of gypsum wallboard panels. The cut panels are coated with a water-dispersible alkali-metal sulfonate-frictional polymer, preferably an alkali metal sulfonate-containing polyester by any known coating technique, e.g., by spraying or rolling. The coating prevents dusting of gypsum particles from the cut edges of gypsum panels, thereby reducing gypsum particle contamination to levels that are compliant with federal standards for clean rooms.

Another aspect of the present invention is to provide a method of sealing cut edges of a gypsum panel with a polymeric binder dispersed in water, without the necessity of adding organic sulfonates, organic solvents or organic sequestering agents to the water/polymer composition.

Further aspects of the invention may become apparent to those skilled in the art from a review of the following detailed description, taken in conjunction with the appended claims. While the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE PREFERRED EMBODIMENTS

Embodiments of the present invention employ the use of water-dispersible alkali metal sulfonate-containing polymers. These water-dispersible polymers are applied to the cut edges of gypsum panels to provide a tough, tack-free coating. The polymer forms a water-insoluble salt through an ion exchange with the calcium found in gypsum wallboard.

Examples of the water-dispersible polymers useful in the coating compositions useful in the methods and coated articles of the present invention are described in U.S. Pat. Nos. 3,734,874, 3,779,993, 4,233,196 and 4,33 5,220, the disclosures of which are incorporated herein by reference. These polymers are, for the most part, water-dispersible because they form electrostatically-stabilized colloids when mixed with water. The colloid particle size varies with the polymer composition but has been shown by light diffraction studies and transmission electron microscopy (on fresh films) to be 200 Å–800 Å in diameter. The solid material in the aqueous colloid dispersions remain sufficiently dispersed over time, in the temperature range of 0.1° to 99.9° C. because the relationship between the particle densities and aqueous dispersion viscosities (very similar to those of water when concentrations are less than 30 weight percent) are such that thermal energy expressed as Brownian motion is sufficient to keep the particles suspended in water.

The preferred water-dispersible polymers have an inherent viscosity of at least 0.1 dL/g, preferably about 0.28–0.38 dL/g, when measured at 25° C. using 0.25 g polymer per 100 ml of a solvent consisting of 60 parts by weight phenol and 40 parts by weight tetrachloroethane.

The polymers are generally comprised of:
 i. water; and
 ii. a water-dispersible alkali metal sulfonate containing polymer.

The preferred alkali metal sulfonate-containing polymers, which are described in U.S. Pat. No. 5,108,788 and hereby incorporated by reference, are comprised of:
 i. monomer residues of at least one dicarboxylic acid;
 ii. about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
 iii. monomer residues of at least one diol or a mixture of a diol and a diamine comprising:
  a. at least 15 mole percent, based on the total mole percent of diol and diamine monomer residues, of a diol having the formula —$(OCH_2CH_2)_n$— where n is 2 to about 20, or
  b. about 0.1 to less than about 15 mole percent, based on the total mole percent of diol and diamine monomer residues, of monomer residues of a poly (ethylene glycol) having the formula —$(OCH_2CH_2)_n$— where n is 2 to about 500, provided that the mole percent of such residues is inversely proportional to the value of n; and optionally,
 iv. monomer residues of at least one difunctional monomer reactant selected from hydroxycarboxylic acids, aminorcarboxylic acids and aminoalkanols; provided that at least 20 percent of the groups linking the monomeric units are ester, i.e., carbonyloxy, linkages.

The preferred water-dispersible polymers thus comprise polyesters and polyesteramides consisting of repeating, alternating residues of (1) one or more dicarboxylic acids and (2) one or more diols or a combination of one or more diols and one or more diamines where, in the preceding definition, the mole percentages are based on 10 mole percent dicarboxylic acid residues and 100 mole percent diol or diol and diamine residues. Alternatively, the polymers may include residues of monomers having mixed functionalities such as hydroxycarboxylic acids, aminocarboxylic acids and/or aminoalkanols.

In the above definition of the water-dispersible polymers, the term "residue" refers to the remainder or reaction product of (i) dicarboxylic acid, (ii) difunctional sulfo monomer, (iii) diol or diol and diamine, and (iv) difunctional monomer, when those components are reacted or condensed according to conventional interchange and polymerization processes.

The residues of component (i) may be derived from one or more dicarboxylic acids or their ester-forming derivatives such as dialkyl esters, bis(hydroxyalkyl) esters, acid chlorides or, in some cases, anhydrides. The sulfonate group of component (ii) may by an alkali metal sulfonic acid salt such as lithium sulfonate, potassium sulfonate or, preferably, sodium sulfonate groups.

The presence of these alkali metal sulfonic salts allow for a unique bond to form between the gypsum panel and the coating. The alkali metal sulfonate groups will ion exchange with any divalent or trivalent metal cations that are present in the gypsum substrate surface. In the case of gypsum wallboard, the predominant cation that is present is $Ca^{2+}$. This ion exchange between the $Ca^{2+}$ in the gypsum surface coated and the alkali metal in the alkali metal sulfonate-containing polymeric coating material strongly binds the polymer to the gypsum surface coated. The insoluble salt resulting from the ion exchange between the alkali metal of the alkali metal sulfonate functionality of the polymer in the coating composition, and the divalent and/or trivalent metal cations (primarily $Ca^{2-}$) in the gypsum edge surface forms the coating that prevents dusting of gypsum particles from the sawed edges of gypsum panels. The coating that is formed is preferably 0.001 to 0.01 inches in thickness.

The concentration of the above-described polymer in the aqueous coating compositions may be varied depending on several factors such as the particular polymer used, and the equipment from which the composition will be applied. Normally, the concentration of the water-dispersible polymer will be at least 5 weight percent based on the total weight of the aqueous composition, with concentrations in the range of about 10 to 40 weight percent being preferred. The aqueous compositions may contain other compounds to promote the drying, penetration and/or visualization of the coating composition, such as dyes and/or pigments. Examples of such compounds include alcohols, preferably lower alcohols, e.g., $C_1$–$C_5$, preferably $C_1$–$C_3$ straight or branched chain alcohols, such as ethanol, propanol and 2-propanol; conventional surface-active agents; and colorants such as Color Index Pigment Yellow 1, 3, 4, 5, 10, 12, 13, 14, 15, 16, 17, 55, 60, 73, 74, 75 and/or 83 as well as C.I. Pigment Orange 1, 14 and/or 15. While not preferred, the aqueous compositions also may contain minor amounts, e.g., up to about 5 weight percent, of another compatible polymeric material.

The preferred water-dispersible polymer is a polyester having an inherent viscosity of about 0.28 to 0.38 dL/g comprised of:
(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethyleneglycol, 1,4-cyclohexanedimethanol monomer residues or mixtures thereof.

Specific embodiments of these water-dispersible polymers are available from Eastman Chemical Products, Inc. in the form of pellets or in the form of aqueous dispersions. Both the pellet form and aqueous dispersion form are sold under the EASTEK 1000 series polymers. These polyesters have been shown to disperse in water due to the presence of 5-sodiosulphonyl isophthalic acid residues.

The aqueous compositions may be applied to sawed edges of laminated gypsum wall panels by any conventional coating means using a brush, sprayer, roller and similar equipment. Preferably, laminated gypsum panels are first passed through a gang saw to cut the ceiling grid panels into desired dimensions, such as a nominal 2'×4' or 2'×2' size. A dust collector then removes the gypsum dust that is generated during sawing. The panels are then treated with the coating composition in any manner, such as by spraying or rolling. The sprayability of the above-described aqueous compositions is an especially advantageous feature of the invention since it permits application of the aqueous compositions over a shorter period of time with less labor costs.

The gypsum panels that may be treated by the method of the present invention include any gypsum wallboard with any conventional wallboard facing material, such as paper. The gypsum wallboard core composition is typically calcium sulfate hemihydrate, which is commonly referred to as "calcined gypsum," "stucco," or "plaster of Paris." Along with calcium sulfate hemihydrate, the dry ingredients in the core composition can also include an accelerator and a binder (e.g., starch). These dry ingredients are mixed together with a "wet" (aqueous) portion of the core composition in a pin mixer apparatus. The wet portion can include a first component, commonly referred to as a "paper pulp solution," that includes a mixture of water, paper pulp, and, optionally one or more fluidity-increasing agents, and a set retarder. The paper pulp solution provides a major portion of the water that forms the gypsum slurry of the core composition. A second wet composition can include a mixture of foam and other conventional additives, if desired. Together, the aforementioned dry and wet portions comprise an aqueous gypsum slurry that forms a wallboard core composition. Typically, gypsum wallboard panels are overlayed with a functional decorative surface such as a rigid vinyl laminate. Preferably, a white textured 2 mil. rigid vinyl laminate is used.

In order to demonstrate the advantageous results of the invention, clean room testing was performed on two separate occasions. The tests were performed by Air Quality Sciences, Inc using a Gordon, Inc. 2" wide heavy duty extruded aluminum Gasketed DS-20 Grid System. The grid system is designed to hold gypsum panels in a manner such that they can be tested in a clean room atmosphere. The grid system used Gordon's ¼"×⅝" DS-20 series gasketing, four standard ½"×23 ¾"×47 ¾" and two non-standard size factory sealed National Gypsum Clean Room Ceiling Panels. The ceiling panels were held in place by using Gordon's HDC-312 and HDC-512 hold down clips. The complete grid system measured 4'–11 ½"×8'–1 ½" along the outside perimeter. Testing of the ceiling panels were conducted in an environmental chamber following the methods established in Federal Standard 209E, "Airborne Particulate Cleanliness Classes in Clean Rooms and Clean Zones."

The testing was performed by first purging the environmental chamber and monitoring it for particles. This initial purging and monitoring established a background level prior to installing the grid system. The particle number concentrations (number of particles/ft³) that were of interest included the size ranges of >0.56 μm and >5.0 μm.

Particle monitoring utilized a Particle Measuring Systems miniLAZ Laser Particle Counter. The mean background particle level prior to the insertion of the ceiling panels for both tests was 2.56 particles/ft³ at >0.5 μm, and below the detection limit at >5.0 μm. This established the chamber as a class 2.6 clean room at >0.5 mm according to Federal Standard FED-STD-209E.

The grid system was then inserted in the chamber. The chamber was then allowed to equilibrate for 23.5 hours. Following the equilibration period with the grid system in the chamber, the particle measurements were made over a one hour period. The mean particle concentration of the first test was 2.85 particles/ft³ at >0.5 μm, and below the detection limit at >5.0 μm. This resulted in a chamber clean room status of Class 2.8 at >0.5 μm with the grid system in place. The mean particle concentration of the second test was 2.73 particles/ft³ at >0.5 μm, and below the detection limit at >5.0 μm. This resulted in a chamber clean room status of Class 2.7 at >0.5 μm with the ceiling panel in place. These results were superior to results reported by competitors.

Other features of the invention will become apparent in the course of the following descriptions of exemplary embodiments which are given for illustration of the invention and are not intended to the limiting thereof.

What is claimed is:

1. A method for sealing cut edges of a gypsum panel comprising coating one or more cut edges of said panel with an effective amount of a composition comprising water and a water-dispersible alkali metal sulfonate-containing polymer.

2. The method of claim 1 wherein the alkali metal sulfonate containing polymer has an inherent viscosity of at least 0.1 dL/g, determined at 25° C. using 0.25 g polymer per 100 ml of a solvent consisting of 60 parts by weight phenol and 40 parts by weight tetrachloroethane.

3. The method of claim 2, wherein the composition comprises water and about 10 to about 40 weight percent, based on the total weight of the composition, of a water-dispersible polymer having an inherent viscosity of about 0.28 to about 0.38 dL/g and wherein:
   i. The dicarboxylic acid residues comprise about 75 to about 84 mole percent isophthalic acid residues and about 16 to about 25 mole percent 5-sodiosulfoisophthalic acid residues; and
   ii. diol residues comprising about 45 to about 60 mole percent diethylene glycol residues and about 40 to about 55 mole percent ethylene glycol, 1,4-cyclohexanedimethanol or mixtures thereof.

4. The method of claim 1, wherein the alkali metal sulfonate-containing polymer comprises:
   i. residues of at least one dicarboxylic acid;
   ii. about 4 to about 25 mole percent, based on the total of all acid, hydroxy, and amino equivalents, of residues of at least one difunctional sulfo monomer containing at least one sulfonate group bonded to an aromatic ring wherein the functional groups are hydroxy, carboxyl, or amino; and
   iii. residues of at least one diol or a mixture of a diol of a diamine comprising:
      a. at least 15 mole percent, based on the total mole percent of diol and diamine residues, of a diol having the formula —(—OCH$_2$CH$_2$—)$_n$— wherein n is 2 to about 20, or
      b. about 0.1 to less than about 15 mole percent, based on the total mole percent of diol and diamine residues, of residues of a poly(ethylene glycol) having the formula —(—OCH$_2$CH$_2$—)$_n$— wherein n is 2 to about 500.

5. The method of claims 4, wherein the alkali metal sulfonate-containing polymer further comprises residues of at least one difunctional monomer reactant selected from the group consisting of hydroxycarboxylic acids, aminocarboxylic acids, and aminoalkanols; provided that at least 20 percent of the groups linking the monomeric units are ester linkages and wherein the term residues refers to the remainder or reaction product of (i) dicarboxylic acid, (ii) difunctional sulfo monomer, (iii) diol or diol and diamine, and (iv) difunctional monomer when those components are reacted or condensed according to interchange and polymerization processes.

6. The method of claim 5, wherein the alkali metal sulfonate-containing polymer comprises at least 5 weight percent based on the total weight of the aqueous composition.

7. The method of claim 6, wherein the composition comprises about 10 to about 40 weight percent, based on the total weight of the composition, of the water-dispersible polymer.

8. The method of claim 7, wherein the composition further includes a colorant in an amount sufficient to visibly distinguish coated edges from non-coated edges.

9. The method of claim 6, wherein the composition comprises about 10 to about 40 weight percent, based on the total weight of the composition of the water-dispersible polymer.

10. A gypsum wallboard panel with cut edges having a coating composition thereon of a water-dispersible polymer, wherein the coating composition comprises water and a water-dispersible alkali metal sulfonate-containing polymer.

11. The gypsum wallboard panel of claim 10, wherein the water-dispersible alkali metal sulfonate-containing polymer has an inherent viscosity of at least 0.1 dL/g, determined at 25° C. using 0.25 g polymer per 100 ml of a solvent consisting of 60 parts by weight phenol and 40 parts by weight tetrachloroethane.

12. The gypsum wallboard panel of claim 10, wherein the water-dispersible alkali metal sulfonate-containing polymer comprises:
   i. residues of at least one dicarboxylic acid;
   ii. about 4 to about 25 mole percent, based on the total of all acid hydroxy, and amino equivalents, of residues of at least one difunctional sulfo monomer containing at least one sulfonate group bonded to an aromatic ring wherein the functional groups are hydroxy, carboxyl, or amino;
   iii. residues of at least one diol or a mixture of a diol of a diamine comprising:
      a. at least 15 mole percent, based on the total mole percent of diol residues or diol and diamine residues, of a diol having the formula —(—OCH$_2$CH$_2$—)$_n$— wherein n is 2 to about 20, or
      b. about 0.1 to less than about 15 mole percent, based on the total mole percent of diol residues or diol and diamine residues, of residues of a poly(ethylene glycol) having the formula —(—OCH$_2$CH$_2$—)$_n$— wherein n is 2 to about 500; provided that the mole percent of such residues is inversely proportional to the value of n; and optionally
   iv. monomer residues of at least one difunctional monomer reactant selected from hydroxycarboxylic acids, aminocarboxylic acids, and aminoalkanols; provided that at least 20 percent of the groups linking the monomeric units are esters.

13. The gypsum wallboard of claim 12, wherein the water-dispersible alkali metal sulfonate-containing polymer further comprises residues of at least one difunctional monomer reactant selected from the group consisting of hydroxycarboxylic acids, aminocarboxylic acids, and aminoalkanols; provided that at least 20 percent of the groups linking the monomeric units are ester linkages and wherein the term residues refers to the remainder or reaction product of (i) dicarboxylic acid, (ii) difunctional sulfo monomer, (iii) diol or diol and diamine, and (iv) difunctional monomer when those components are reacted or condensed according to interchange and polymerization processes.

14. The gypsum wallboard of claim 13 wherein the water-dispersible alkali metal sulfonate-containing polymer comprises at least 5 weight percent based on the total weight of the aqueous composition.

15. The gypsum wallboard of claim 14 wherein the coating composition comprises about 10 to about 40 weight percent, based on the total weight of the composition, of the water-dispersible polymer.

16. The gypsum wallboard of claim 15 wherein the coating composition comprises a colorant in an amount sufficient to visibly distinguish coated edges from non-coated edges.

17. The gypsum wallboard of claim 16, wherein the composition comprises about 10 to about 40 weight percent, based on the total weight of the composition of the water-dispersible polymer.

18. The gypsum wallboard of claim 17 wherein the coating composition comprises water and about 10 to about 40 weight percent, based on the total weight of the composition, of a water-dispersible polymer having an inherent viscosity of about 0.28 to about 0.38 dL/g and wherein:

i. The dicarboxylic acid residues comprise about 75 to about 84 mole percent isophthalic acid residues and about 16 to about 25 mole percent 5-sodiosulfoisophthalic acid residues; and ii. diol residues comprising about 45 to about 60 mole percent diethylene glycol residues and about 40 to about 55 mole percent ethylene glycol, 1,4-cyclohexanedimethanol or mixtures thereof.

19. The gypsum wallboard of claim 10 wherein the wallboard is suitable for use in a clean room.

20. The gypsum wallboard of claim 19 wherein the clean room has a mean particle concentration of no more than 2.73 particles/ft$^3$ where the particles are >0.5 $\mu$m.

* * * * *

UNITED STATES PATENT AND TRADEMARK OFFICE
CERTIFICATE OF CORRECTION

PATENT NO.   : 6,468,632 B2
DATED        : October 22, 2002
INVENTOR(S)  : Winkowski Page 1 of 1

It is certified that error appears in the above-identified patent and that said Letters Patent is hereby corrected as shown below:

Column 6,
Line 29, "Claim 6" should read -- claim 8 --.

Signed and Sealed this

Twenty-first Day of January, 2003

JAMES E. ROGAN
*Director of the United States Patent and Trademark Office*